US008763260B2

(12) United States Patent
Ranieri et al.

(10) Patent No.: US 8,763,260 B2
(45) Date of Patent: Jul. 1, 2014

(54) MODULAR SAW

(75) Inventors: Eric Ranieri, Besancon (FR); Stephen Rowlay, Sheffield (GB); Robert Christie, South Glastonbury, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 400 days.

(21) Appl. No.: 12/835,594

(22) Filed: Jul. 13, 2010

(65) Prior Publication Data

US 2012/0011732 A1 Jan. 19, 2012

(51) Int. Cl.
*B23D 49/10* (2006.01)
*B23D 49/12* (2006.01)

(52) U.S. Cl.
USPC .................................. 30/512; 30/517; 30/513

(58) Field of Classification Search
USPC ................. 30/166.3, 507, 512, 513, 510, 517
See application file for complete search history.

(56) References Cited

U.S. PATENT DOCUMENTS

| | | | | |
|---|---|---|---|---|
| 1,245,345 A * | 11/1917 | Howell | ............................ | 30/507 |
| 1,835,638 A | 12/1931 | Cunneen | ......................... | 30/513 |
| 2,173,365 A | 9/1939 | Kessler | ............................ | 30/510 |
| 2,514,880 A | 7/1950 | Leatherman | .................... | 30/513 |
| 2,559,686 A | 7/1951 | Suhre | ................................. | 30/510 |
| 2,612,920 A | 10/1952 | Williams | ........................ | 30/511 |
| 2,782,821 A | 2/1957 | Gunnerson | ...................... | 30/510 |
| 4,680,863 A | 7/1987 | Duffy | ............................... | 30/511 |
| 5,074,002 A | 12/1991 | Huang | .............................. | 7/149 |
| 5,471,752 A | 12/1995 | Koetsch | ........................... | 30/513 |
| 5,577,325 A | 11/1996 | Bentley | ............................ | 30/507 |
| 5,768,788 A | 6/1998 | Arnold | .............................. | 30/513 |
| 5,826,344 A | 10/1998 | Phelon et al. | .................... | 30/513 |
| 6,070,330 A | 6/2000 | Phelon et al. | .................... | 30/513 |
| 6,079,109 A | 6/2000 | Ranieri | ............................ | 30/513 |
| 6,098,294 A | 8/2000 | Lemos | .............................. | 30/513 |
| 6,134,791 A | 10/2000 | Huang | ............................. | 30/513 |
| D477,981 S | 8/2003 | Snider | ............................... | D8/96 |
| 6,606,795 B2 | 8/2003 | Erisoty et al. | ................... | 30/512 |

(Continued)

FOREIGN PATENT DOCUMENTS

| | | |
|---|---|---|
| DE | 91 07 296 U1 | 8/1991 |
| EP | 1 595 631 A1 | 11/2005 |
| FR | 2293277 A * | 8/1976 |

OTHER PUBLICATIONS

Extended Search Report, including the Search Opinion, as issued for European Patent Application No. 11172498.5, dated Nov. 4, 2011.

*Primary Examiner* — Kenneth E. Peterson
*Assistant Examiner* — Jennifer Swinney
(74) *Attorney, Agent, or Firm* — Pillsbury Winthrop Shaw Pittman LLP

(57) ABSTRACT

A modular saw arrangement includes a main saw frame structure and a detachable handle structure. A second end portion of the detachable handle structure includes a first blade connector and a second blade connector. A blade tensioner arrangement of the main saw frame structure and the first blade connector are configured to be connected with opposite ends of a blade when a first end portion of the detachable handle structure is connected with an upper frame portion of the main saw frame structure so as to form a hacksaw configuration. The second blade connector that enables attachment of the blade in a grip configuration to enable the detachable handle structure to be configured as a stand-alone detachable handle saw when the first end portion is disconnected with the upper frame portion.

35 Claims, 12 Drawing Sheets

(56) References Cited

U.S. PATENT DOCUMENTS

| | | | |
|---|---|---|---|
| 6,729,030 B2 | 5/2004 | Huang | 30/513 |
| 6,742,268 B2 | 6/2004 | Chen | 30/519 |
| 6,820,340 B1 | 11/2004 | Martin et al. | 30/506 |
| 6,820,341 B2 | 11/2004 | Snider | 30/513 |
| 6,925,720 B2 | 8/2005 | Ranieri | 30/513 |
| 7,007,394 B2 | 3/2006 | Erisoty et al. | 30/512 |
| 7,174,644 B2 | 2/2007 | Critelli et al. | 30/512 |
| 7,210,234 B2 * | 5/2007 | Chen | 30/513 |
| 7,254,893 B1 | 8/2007 | Huang | 30/512 |
| 7,617,608 B2 * | 11/2009 | Zakarian | 30/514 |
| 2003/0056377 A1 | 3/2003 | Huang | 30/513 |
| 2003/0196339 A1 * | 10/2003 | Snider | 30/513 |
| 2004/0020062 A1 | 2/2004 | Ducret | 30/512 |
| 2006/0010696 A1 | 1/2006 | Critelli | 30/506 |
| 2008/0115370 A1 | 5/2008 | Chao | 30/513 |
| 2008/0127499 A1 | 6/2008 | Zakarian | 30/514 |
| 2009/0113729 A1 * | 5/2009 | Chen | 30/513 |

* cited by examiner

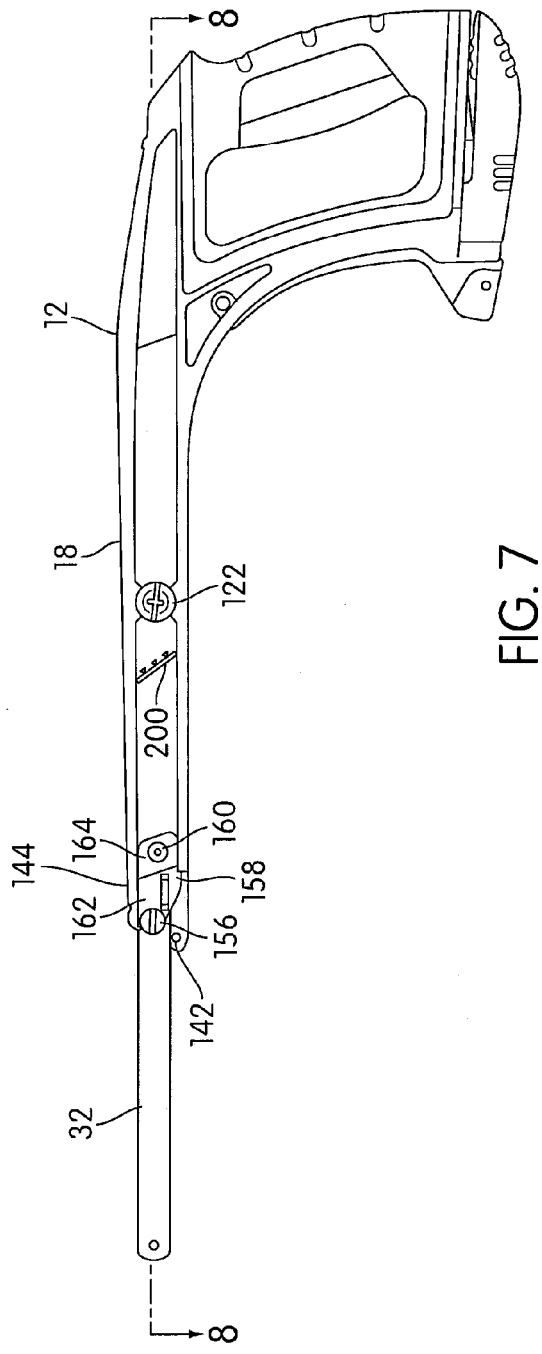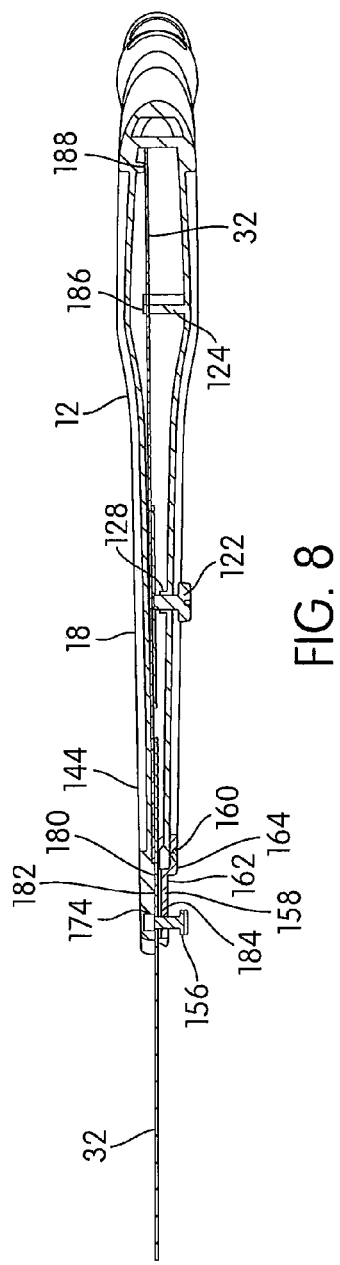

MODULAR SAW

BACKGROUND OF THE INVENTION

Field of the Invention

The present invention relates to saws.

Saws come in a variety of configurations. For example, a typical hacksaw includes a cutting blade, a frame, and a handle member disposed toward rearward end of the frame. One end of the cutting blade is removably mounted to a lower forward end of the frame and the other end is removably mounted to a blade tensioning device. The blade tensioning device may be provided on the frame or a lower portion of the handle member such that the blade is mounted and tensioned between the blade tensioning device and the lower forward end of the frame. Saws may have an extended profile or a low profile saw configuration. Other saws include a long reach jab saw configuration and a pistol grip jab saw configuration, for example.

The present invention provides improvements over the prior art saws.

SUMMARY

One aspect of the invention relates to a modular saw arrangement that includes a main saw frame structure and a detachable handle structure. The main saw frame structure includes a handle construction, an upper frame portion, and a blade tensioner arrangement, and the detachable handle structure includes a first end portion and a second end portion. A first connector structure is associated with the upper frame portion of the main saw frame structure and/or the first end portion of the detachable handle structure. The first connector structure is arranged to releasably connect the first end portion of the detachable handle structure to the upper frame portion of the main saw frame structure. The second end portion of the detachable handle structure includes a first blade connector. The first blade connector and the blade tensioner arrangement are configured to be connected with opposite ends of a blade when the first end portion of the detachable handle structure is connected with the upper frame portion of the main saw frame structure so as to form a hacksaw configuration. The first end portion of the detachable handle structure includes a handle region. The second end portion of the detachable handle structure includes a second blade connector that enables attachment of the blade in a grip configuration to enable the detachable handle structure to be configured as a stand-alone detachable handle saw when the first end portion of the detachable handle structure is disconnected with the upper frame portion of the main saw frame structure.

Another aspect of the invention relates to a modular saw arrangement that includes a first blade, a main saw frame structure, and a detachable handle structure. The main saw frame structure includes a handle construction, an upper frame portion, and a blade tension arrangement. The detachable handle structure is constructed and arranged to releasably connect with the upper frame portion of the main saw frame structure. The blade tensioner arrangement and a connector on the detachable handle structure is arranged to connect with opposite ends of a first blade to provide a hacksaw configuration. The upper frame portion of the main saw frame structure includes a blade storage for storing a second blade. The detachable handle structure includes a detachable handle saw attachment structure enabling attachment of one of the first blade or the second blade, and the upper frame portion of the main saw frame structure includes a main saw attachment structure enabling attachment of the other of the first blade or the second blade such that when the detachable handle structure and the main saw frame structure are disconnected from one another, both are configured to perform cutting operations.

Another aspect of the invention relates to a modular saw arrangement that includes a main saw frame structure, and a detachable handle structure. The main saw frame structure includes a handle construction, an upper frame portion, and a blade tension arrangement. The main saw frame structure and the detachable handle structure are releasably connectable to form a hacksaw frame, wherein the main saw frame structure and the detachable handle frame structure respectively adapted to receive opposite ends of a saw blade. The main saw frame structure includes connectors constructed and arranged to receive opposite ends of a saw blade to form a low profile hacksaw when the main saw frame structure is disconnected from the detachable handle structure. The upper frame portion of the main saw frame structure further arranged, when disconnected from the detachable handle structure, to connect with one end portion of the a saw blade, with the opposite end portion of the saw blade extending away from the handle construction. The detachable handle structure constructed and arranged, when disconnected from the main saw frame structure, to connect with one end portion of a saw blade to form a jab saw configuration, with the detachable handle structure providing a handle portion for the jab saw configuration.

These and other aspects of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one example of the invention, the structural components illustrated herein can be considered drawn to scale. It is to be expressly understood, however, that many other configurations are possible and that the drawings are for the purpose of example, illustration and description only and are not intended as a definition or to limit the scope of the invention. It shall also be appreciated that the features of one embodiment disclosed herein can be used in other embodiments disclosed herein. As used in the specification and in the claims, the singular form of "a", "an", and "the" include plural referents unless the context clearly dictates otherwise.

BRIEF DESCRIPTION OF THE DRAWINGS

FIG. 7 shows a side view of the main saw frame in an inside cut configuration or a long reach jab saw configuration in accordance with an embodiment of the present invention;

FIG. 8 shows a cross-sectional view of the main saw frame structure (i.e., in an inside cut configuration or a long reach jab saw configuration) taken through the line 8-8 in FIG. 7 in accordance with an embodiment of the present invention;

DETAILED DESCRIPTION OF THE INVENTION

Figure 1:
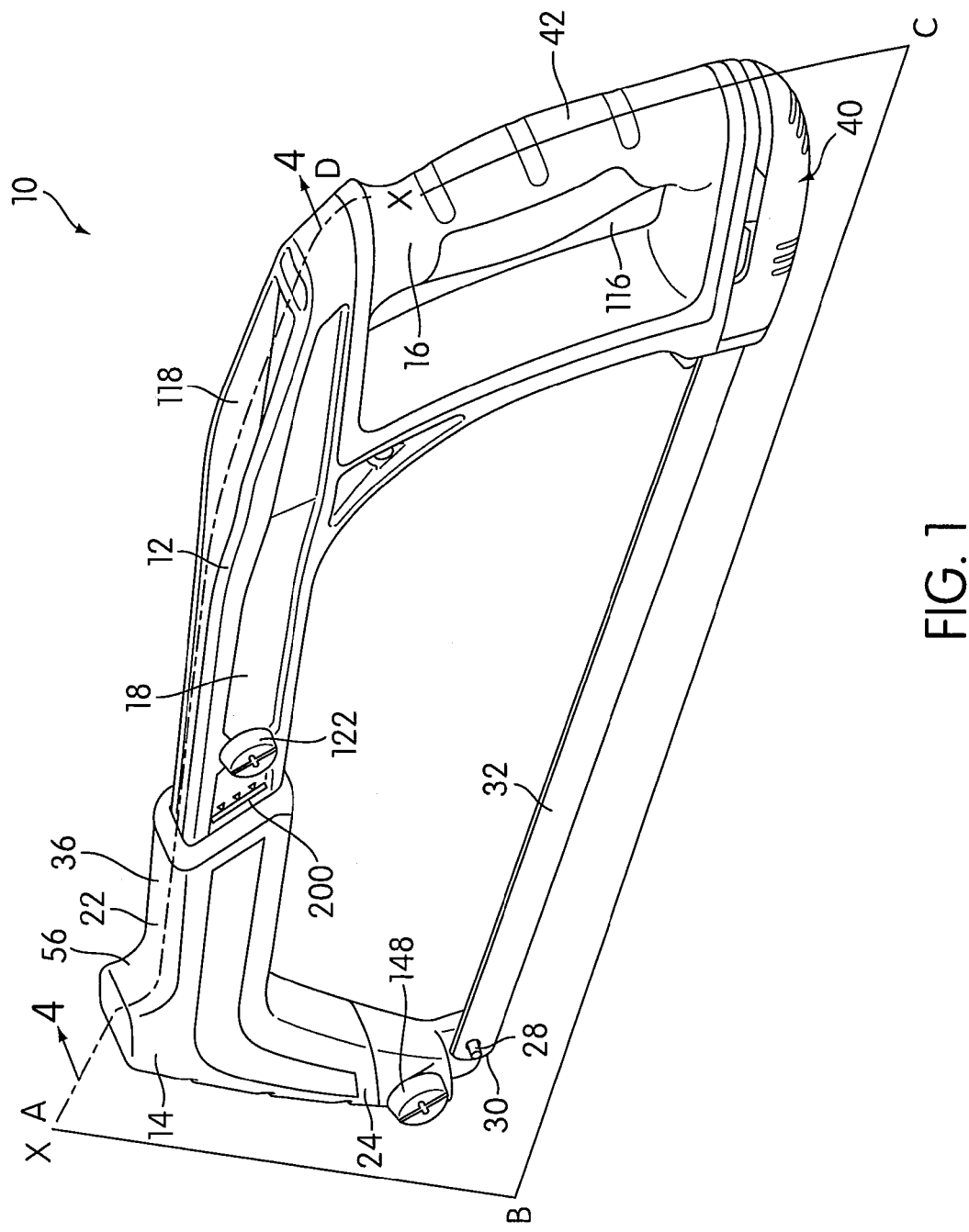
FIG. 1 shows a left side perspective view of a modular saw arrangement in a regular hacksaw configuration in accordance with an embodiment of the present invention.
Figure 3:
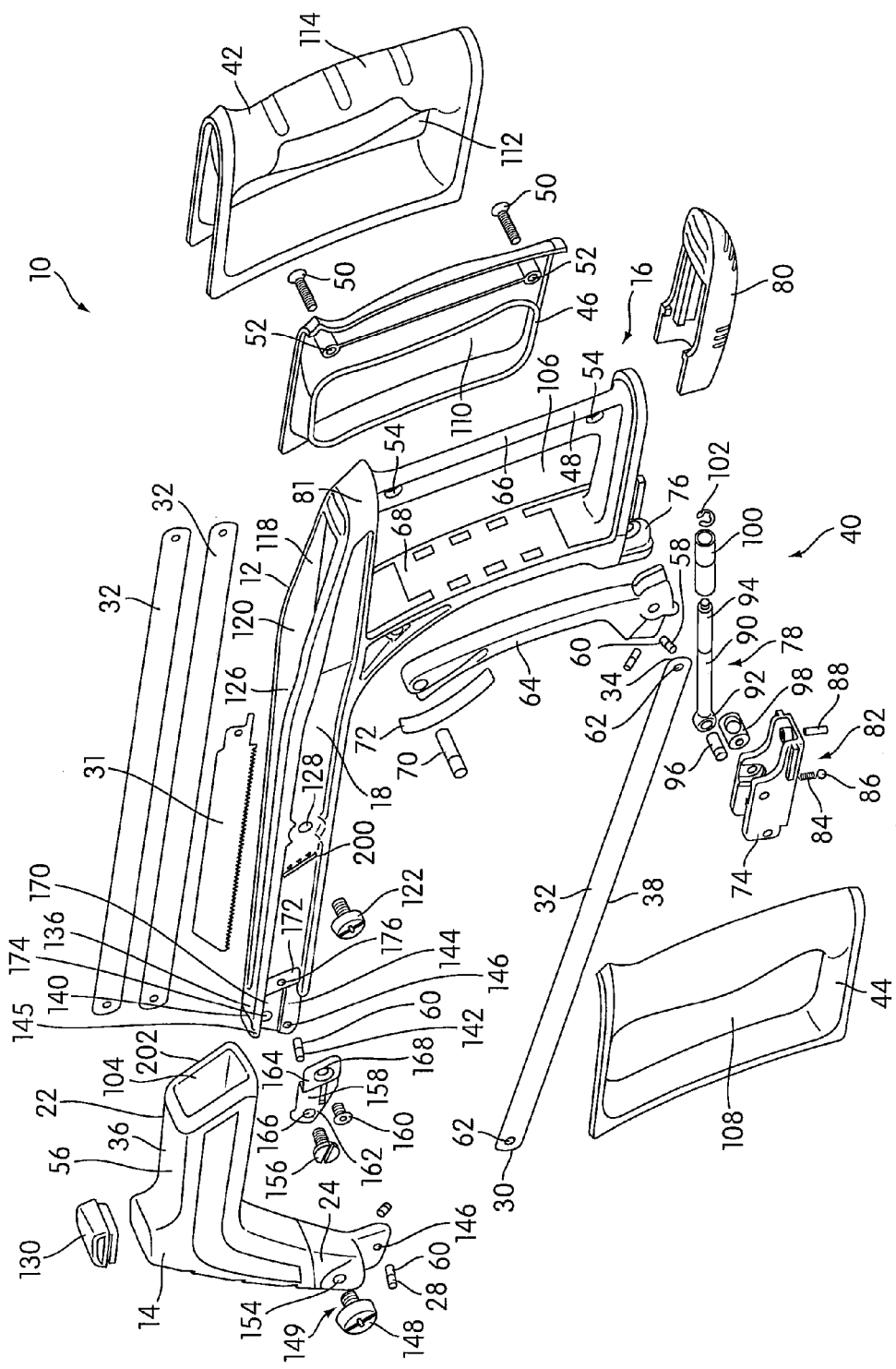
FIG. 3 shows an exploded view of the modular saw arrangement in accordance with an embodiment of the present invention.

FIGS. 1 and 3 show a modular saw arrangement 10 in accordance with an embodiment of the present invention. The modular saw arrangement 10 includes a main saw frame structure 12 and a detachable handle structure 14. The main saw frame structure 12 includes a handle construction 16, an upper frame portion 18, and a blade tensioner arrangement 40, and the detachable handle structure 14 includes a first end portion 22 and a second end portion 24.

In one embodiment, the detachable handle structure 14 is a pistol grip saw frame structure. In one embodiment, the handle construction 16 of the main saw frame structure 12 is a closed handle construction. In one embodiment, the main saw frame structure 12 is a long reach saw frame structure. In one embodiment, the main saw frame structure 12 is a low profile saw frame structure.

A first connector structure 130 is associated with the upper frame portion 18 of the main saw frame structure 12 and/or the first end portion 22 of the detachable handle structure 14. The first connector structure 130 is arranged to releasably connect the first end portion 22 of the detachable handle structure 14 to the upper frame portion 18 of the main saw frame structure 12.

Figure 2A:
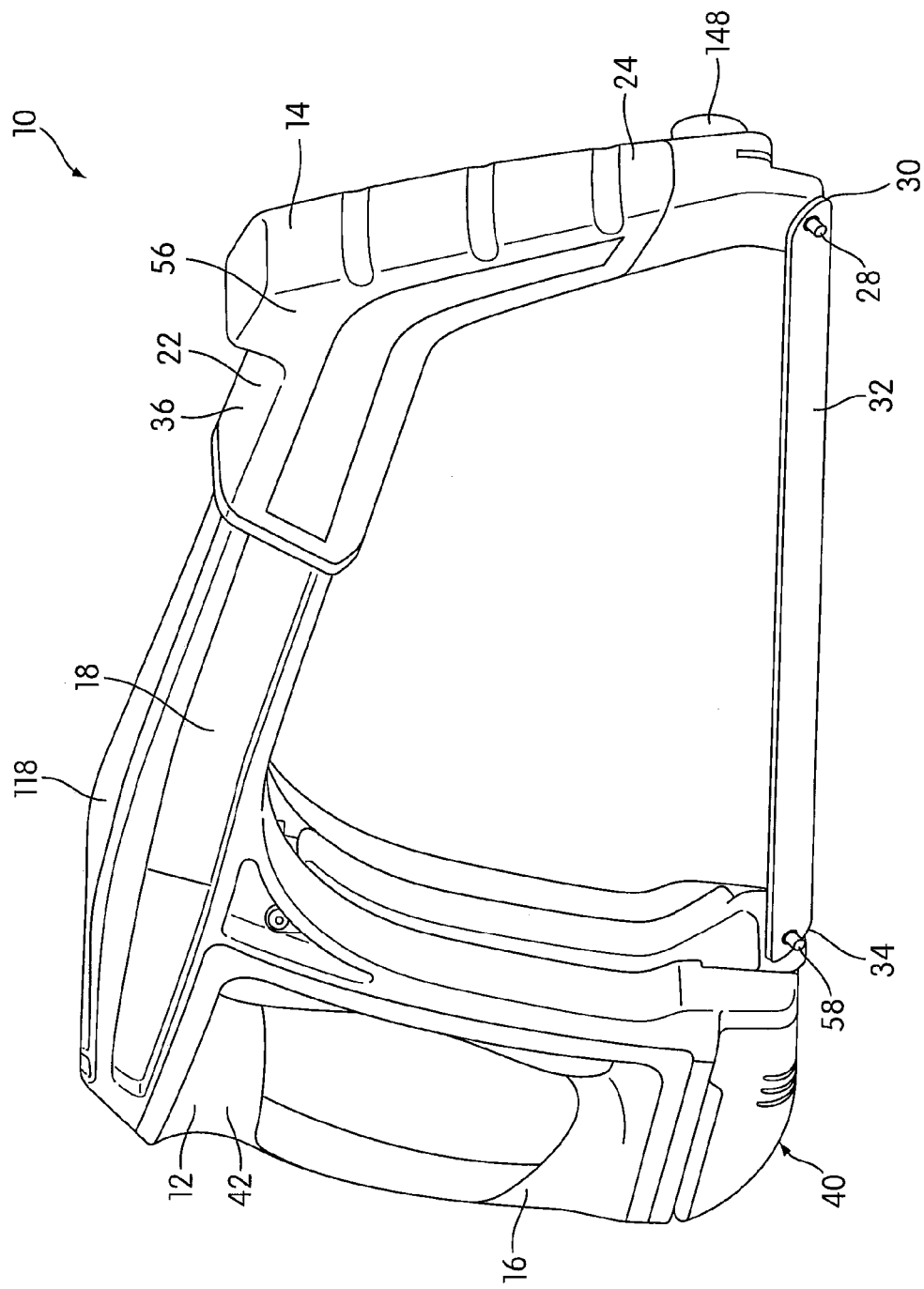
FIG. 2A shows a left side perspective view and FIGS. 2B-E show side views of the modular saw arrangement in different configurations in accordance with an embodiment of the present invention.
Figure 2B:
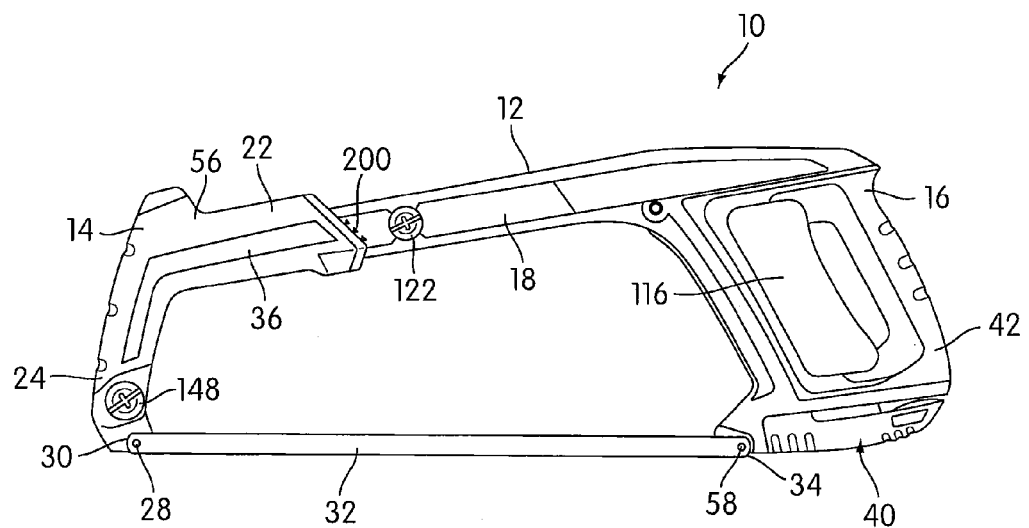

The second end portion 24 of the detachable handle structure 14 includes a first blade connector 28. The first blade connector 28 and the blade tensioner arrangement 40 are configured to be connected with opposite ends 30, 34 of a blade 32 when the first end portion 22 of the detachable handle structure 14 is connected with the upper frame portion 18 of the main saw frame structure 12 so as to form a hacksaw configuration (as shown in FIGS. 1, 2A and 2B).

The first end portion 22 of the detachable handle structure 14 includes a handle region 36. The second end portion 24 of the detachable handle structure 14 includes a second blade connector 148 that enables attachment of the blade 32 in a grip (e.g., pistol grip) configuration (as shown in FIGS. 2E, 9, 11 and 12) to enable the detachable handle structure 14 to be configured as a stand-alone detachable handle saw when the first end portion 22 of the detachable handle structure 14 is disconnected with the upper frame portion 18 of the main saw frame structure 12.

Figure 2C:
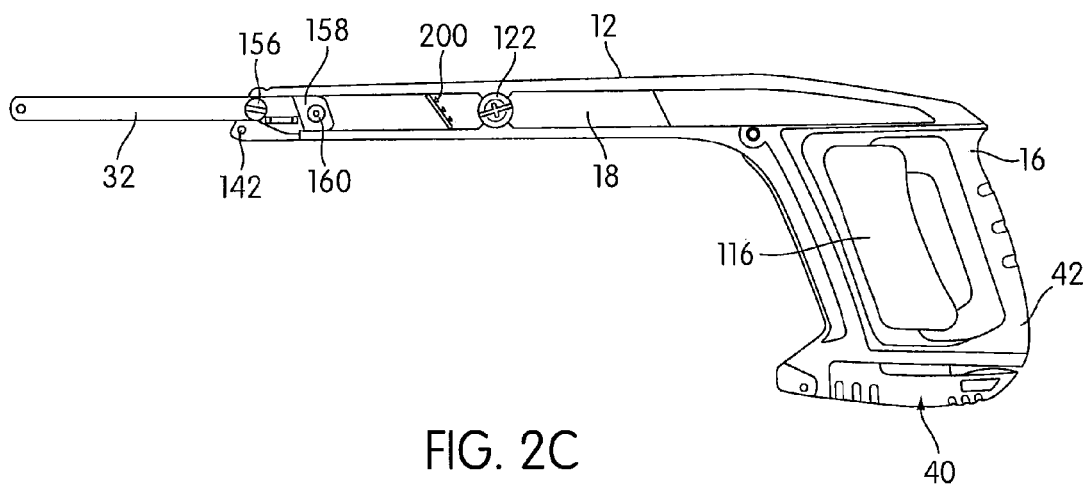

Also, the upper frame portion 18 of the main saw frame structure 12 includes a blade clamp arrangement that enables attachment of the blade 32 thereto to enable the main saw frame structure 12 to be configured as a stand-alone long reach jab saw (e.g., an inside cut or a long reach jab saw configuration shown in FIGS. 2C and 7). The upper frame portion 18 of the main saw frame structure 12 includes a blade connector structure 142 at a distal end 145 thereof that enables attachment of the blade 32 between the blade connector structure 142 and the blade tensioner arrangement 40 to enable the main saw frame structure 12 to be configured as a stand-alone low profile hacksaw (e.g., a low profile hacksaw configuration shown in FIGS. 2D and 6).

The modular saw arrangement 10 in accordance with an embodiment of the present invention solves a problem of lack of versatility of a typical hacksaw. For example, a user only needs to buy a single hacksaw to get a multitude of features and saw configurations (as shown in FIGS. 2A-E). A transforming frame structure (i.e., the main saw frame structure 12 and the detachable handle structure 14) of the modular saw arrangement 10 converts to different saw configurations (as shown in FIGS. 2A-E) to provide a variety of different cutting applications. The modular saw arrangement 10 replaces at least four different/separate saws by converting itself to the needed tool for the cutting application.

Figure 2D:
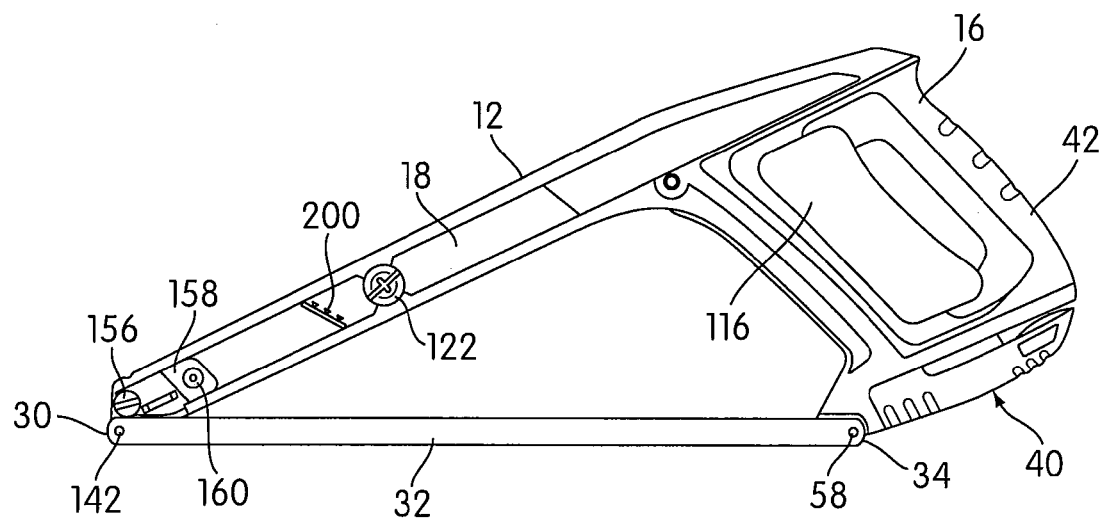
Figure 2E:
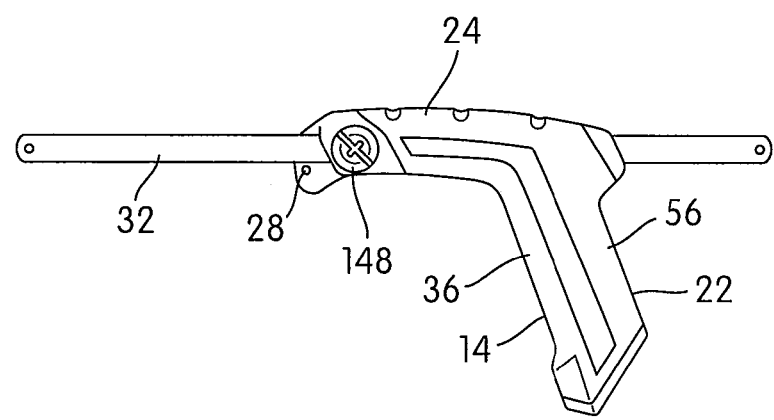

FIG. 2A shows a left side perspective view and FIGS. 2B-E show side views of the modular saw arrangement in different configurations in accordance with an embodiment of the present invention. Specifically, FIG. 2A shows a left side perspective view of the modular saw arrangement in the regular hacksaw configuration, where the blade 32 is positioned in a 45 degree orientation; FIG. 2B shows a side view of the modular saw arrangement 10 in the regular hacksaw configuration, where the blade 32 is positioned in a 90 degree orientation; FIG. 2C shows a side view of the modular saw arrangement in an inside cut saw configuration or a long reach jab saw configuration; FIG. 2D shows a side view of the modular saw arrangement in a low profile saw configuration; and FIG. 2E shows a side view of the modular saw arrangement in a grip (e.g., pistol grip) jab saw configuration.

Regular Profile Hacksaw Configuration:

The regular profile hacksaw configuration shown in FIGS. 1, 2A and 2B are most commonly used by the user. The regular profile hacksaw configuration is obtained by using both the main saw frame structure 12 and the detachable handle structure 14 of the modular saw arrangement 10 along with the blade 32 of the modular saw arrangement 10. In this arrangement, the modular saw arrangement 10 may be used in a one or two handed grip arrangement. In this configuration, the modular saw arrangement 10 provides a high tension, deep throat hacksaw with 90 degree blade orientation (as shown in FIGS. 1 and 2A) and 45 degree blade orientation (as shown in FIG. 2B). When the blade 32 is positioned in the 90 degree blade orientation, the blade 32 lies generally parallel to a vertical plane ABCD (as shown in FIG. 1) that extends through a central axis X-X (as shown in FIG. 1) of the main saw frame structure 12 and the detachable handle structure 14. When the blade 32 is positioned in the 45 degree blade orientation, the blade 32 positioned to make an angle with respect to the vertical plane ABCD (as shown in FIG. 1) that extends through the central axis X-X (as shown in FIG. 1) of the main saw frame structure 12. In one embodiment, with the blade 32 in 45 degree blade orientation, the modular saw arrangement 10 may be used to provide flush cuts. A hacksaw blade 32 may be used in this configuration.

Low Profile Hacksaw Configuration:

The low profile hacksaw configuration is obtained by using the main saw frame structure (or the low profile saw frame structure) 12 and the blade 32 of the modular saw arrangement 10. The low profile hacksaw configuration shown in FIGS. 2D and 6 may be used in tight openings or other places that are difficult to access (i.e., hard-to-reach areas where the regular hacksaw configuration does not fit). In this arrangement, the modular saw arrangement 10 may be used in a one handed grip arrangement. As will be clear from the discussions below, when the main saw frame structure 12 of the modular saw arrangement 10 is used in the low profile hacksaw configuration, the detachable handle structure 14 of the modular saw arrangement 10 may be used in a grip (e.g., pistol grip) jab saw configuration to independently and/or simultaneously perform a cutting operation. A hacksaw blade 32 may be used in this configuration.

Inside Cut Saw Configuration or Long Reach Jab Saw Configuration:

The inside cut saw configuration or the long reach jab saw configuration is obtained by using the main saw frame structure 12 and the blade 32 of the modular saw arrangement 10. This configuration is obtained in a similar manner as the low profile hacksaw configuration with the exception of mounting the blade 32, as will be clear from the discussions below with respect to FIGS. 7 and 8. The inside cut saw configuration or the long reach jab saw configuration shown in FIGS. 2C and 7 may be used in very tight openings or other places that are very difficult to access (i.e., deep reach areas where the regular hacksaw configuration and the low profile hacksaw configuration does not fit). In this configuration, the modular saw arrangement 10 may be used to provide a different types of inside cuts. In this configuration, the modular saw arrangement 10 may be used in a one or a two handed grip arrangement. As will be clear from the discussions below, when the main saw frame structure 12 of the modular saw arrangement 10 is used in the inside cut saw configuration or the long reach jab saw configuration, the detachable handle structure 14 of the modular saw arrangement 10 may be used in a grip (e.g., pistol grip) jab saw configuration to independently and/or simultaneously perform a cutting operation. A hacksaw blade 32 or a reciprocating saw blade 31 (as shown in FIG. 3) may be used in this configuration.

Figure 9:
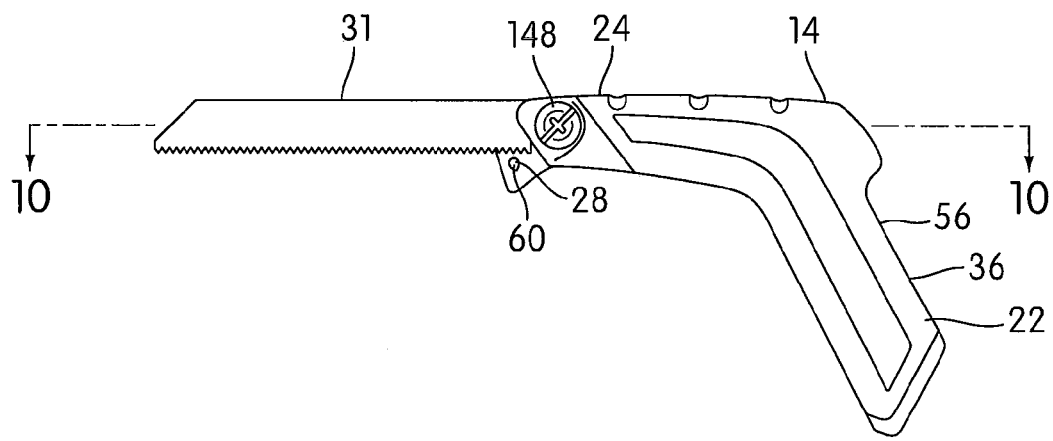
FIG. 9 shows a side view of the detachable handle structure in a pistol grip jab saw configuration in accordance with an embodiment of the present invention.
Figure 10:
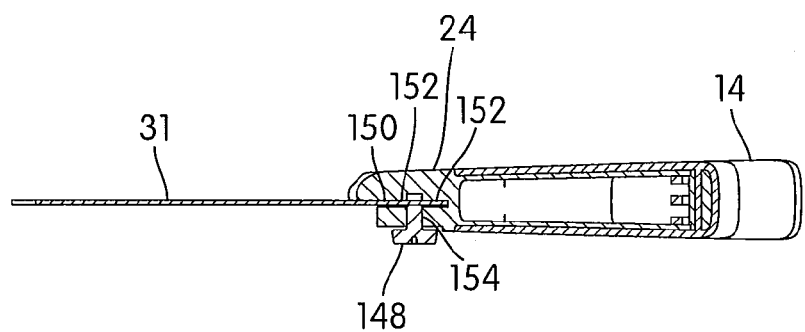
FIG. 10 shows a cross-sectional view of the detachable handle structure (i.e., in a pistol grip jab saw configuration) taken through the line 10-10 in FIG. 9 in accordance with an embodiment of the present invention.
Figure 11:
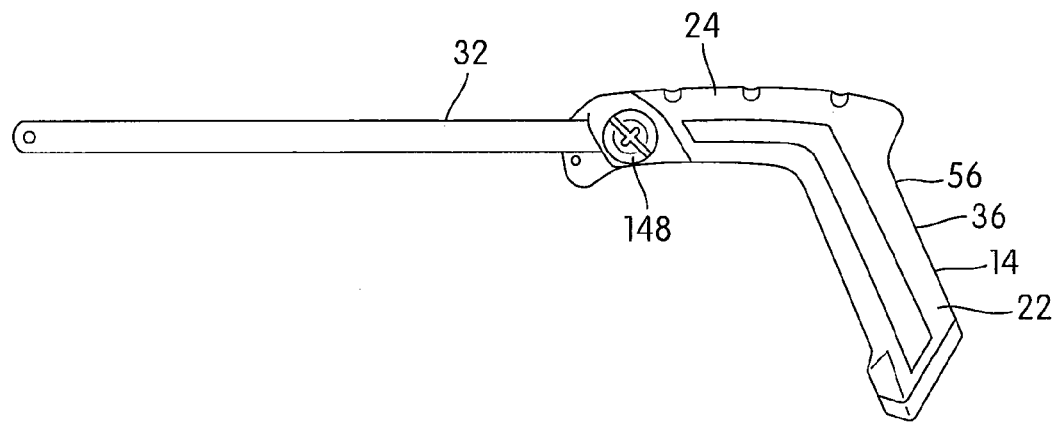
FIGS. 11 and 12 show side views of the detachable handle structure in the different grip jab saw configurations, where the blade member is a hacksaw blade in accordance with an embodiment of the present invention.
Figure 12:
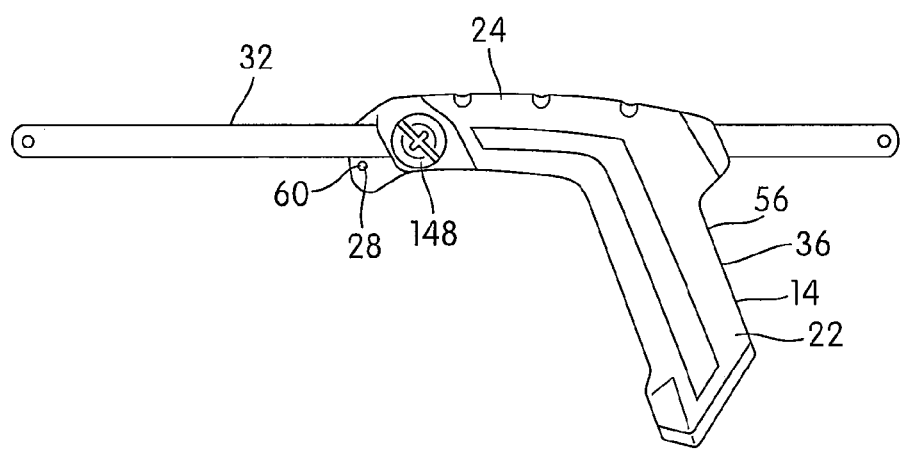

Grip Jab Saw Configuration:

The pistol grip jab saw configuration is obtained by using the detachable handle structure 14 and the blade 32 of the modular saw arrangement 10. The pistol grip jab saw configuration shown in FIGS. 2E, 9, 11 and 12 may be used in a pistol grip hand position to allow maneuverability and control in extremely tight areas for cutting awkwardly positioned material. For example, this configuration may be used in drywall cutting. A hacksaw blade 32 (as shown in FIGS. 11 and 12) or a reciprocating saw blade 31 (as shown in FIGS. 9 and 10) may be used in this configuration. As will be clear from the discussions below, when the detachable handle structure 14 of the modular saw arrangement 10 is used in a pistol grip jab saw configuration, the main saw frame structure 12 of the modular saw arrangement 10 may be used in the inside cut saw configuration (or the long reach jab saw configuration) or in the low profile hacksaw configuration to independently and/or simultaneously perform a cutting operation.

Figure 4:
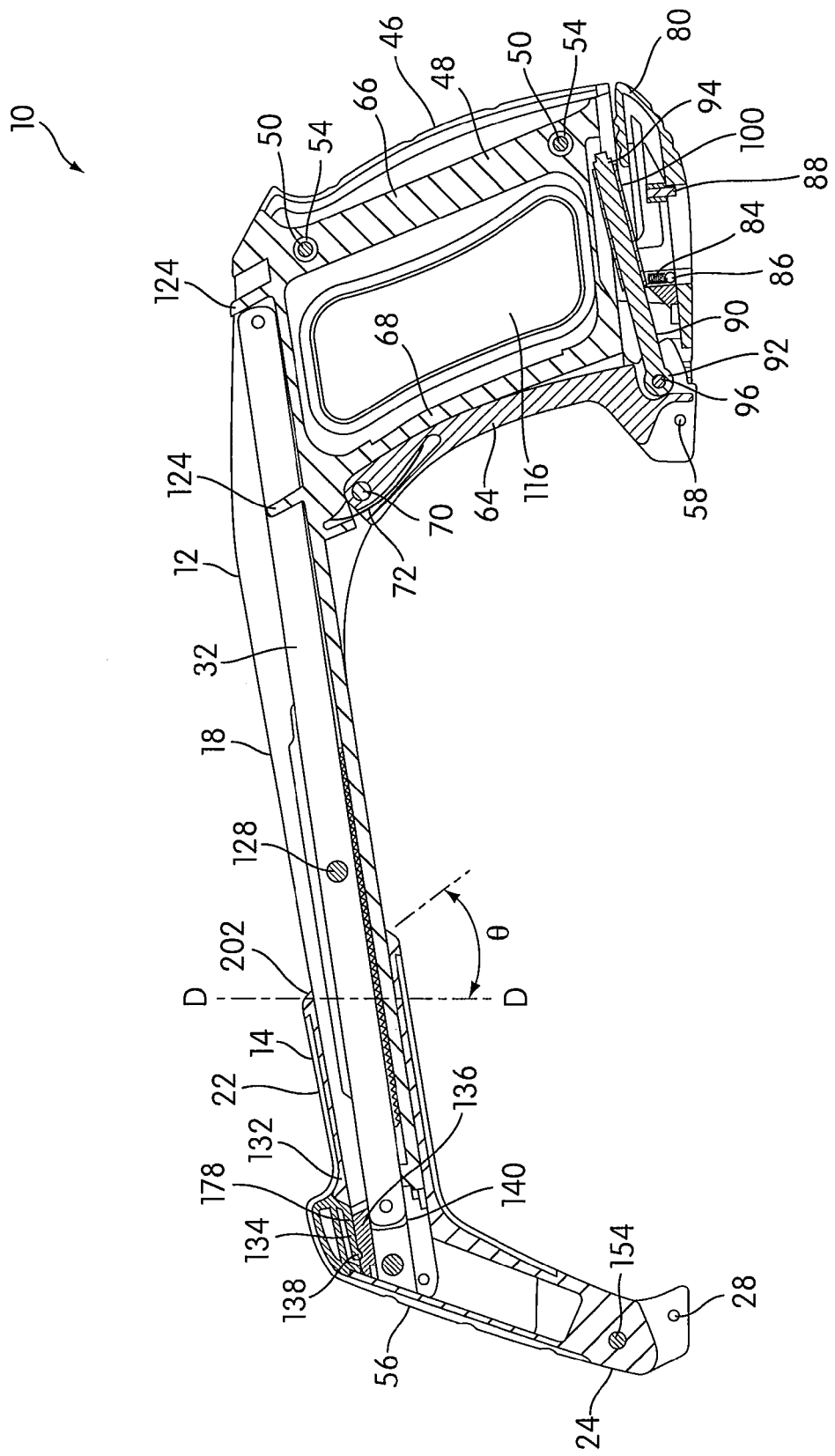
FIG. 4 shows a cross-sectional view of the modular saw arrangement taken through the line 4-4 in FIG. 1 in accordance with an embodiment of the present invention.

FIG. 3 is an exploded view of the modular saw arrangement 10, and FIG. 4 is a cross-sectional view of the modular saw arrangement taken through the line 4-4 in FIG. 1. As shown in these figures, the handle structure 16 of the main saw frame structure 12 includes a frame member 48, a first handle portion 44 and a second handle portion 46. The first handle portion 44 and the second handle portion 46 are secured to the frame member 48 using, for example, fasteners 50. The fasteners 50 are passed through screw receiving openings 52 and 54 disposed on the second handle portion 46 and the frame member 48, respectively, to secure the second handle portion 46 with the frame member 48. Although, not shown, the first handle portion 44 also includes screw receiving openings that are configured to receive the fasteners 50 to secure the first handle portion 44 with the frame member 48. When secured, the first handle portion 44 and the second handle portion 46 sandwich the frame member 48. In one embodiment, the first handle portion 44, the second handle portion 46, and the frame member 48 are assembled together into a single piece and cannot be disassembled by the user or the customer.

The frame member 48 of the handle construction 16 includes a handle member 66 and a guard member 68, the guard member 68 protecting the user's hand in use. In one embodiment, the frame member 48 includes an opening 106 disposed between the handle member 66 and the guard member 68. The first handle portion 44, the second handle portion 46 and a grip 42 (as explained below) include openings 108, 110 and 112, respectively, that are constructed and arranged to align with the opening 106 to form an opening 116 (as shown in FIG. 4). The user can manually grasp the handle construction 16 by inserting his fingers through the opening 116 and gripping a gripping portion 114 of the handle construction 16. In one embodiment, the handle construction 16 of the main saw frame structure 12 is a closed handle construction.

In one embodiment, the upper frame portion 18 and the frame member 48 of the main saw frame structure 12 are, for example, formed of a metal material. In one embodiment, the upper frame portion 18 and the frame member 48 of the main saw frame structure 12 are, for example, formed of a die cast aluminum material. In one embodiment, the frame member 48 is made of a die case aluminum material, while the first and the second handle portions 44 and 46 are made of a plastic material.

In one embodiment, the handle region 36 of the detachable handle structure 14 and the handle construction 16 of the main saw frame structure 12 may be overmolded with a grip 42 or 56 to protect and reinforce them.

For example, as shown in FIG. 3, the handle construction 16 is overmolded with a grip 42 to provide impact protection and facilitate gripping of the modular saw arrangement 10 in the low profile saw configuration and the long reach jab (or inside cut) saw configuration. In one embodiment, the grip 42 is secured to the grip supporting portions of the first and second portions 44 and 46 using adhesive bonding, riveting, or any other attachment mechanism as would be appreciated by one skilled in the art. In one embodiment, the grip 42 is secured to the grip supporting portions of the first and second portions 44 and 46 after securing the first and second portions 44 and 46 with each other. In one embodiment, the grip 42 can be slid off of the grip supporting portions to provide the user the ability to change the grip 42 with a new or a different grip.

The handle region 36 of the detachable handle structure 14 is overmolded with a grip 56 to provide impact protection and facilitate gripping of the modular saw arrangement 10 in the pistol grip jab saw configuration. In one embodiment, the grip 56 is secured to the handle region 36 using adhesive bonding, riveting, or any other attachment mechanism as would be appreciated by one skilled in the art.

In one embodiment, the grips 42 and 56 may be made from deformable material to cushion the gripping portion and to enhance manual grasping and comfort. The grips 42 and 56 may be a single layer of molded material or multiple layers of molded material including an inner foam layer bonded to the handle surface and an exterior molded layer of a skin material surrounding the foam layer.

In one embodiment, the grips 42 and 56 are in a thick, soft foam rubber. In another embodiment, the grips 42 and 56 are formed from a relatively rigid elastomeric, rubber based, or plastic material. In yet another embodiment, the grips 42 and 56 are formed from a thermoplastic elastomers (TPE) or thermoplastic rubbers.

The first blade connector 28 of the detachable handle structure 14 provides a first blade mount 28 and the blade tensioner arrangement 40 (as explained below) provides a second blade mount 58. When the modular saw arrangement 10 is used in a regular hacksaw configuration (as shown in FIGS. 1, 2A and 2B), one of the longitudinal end portions 30 of the blade 32 is removably mounted on the first blade mount 28 and the other of the longitudinal end portions 34 of the blade 32 is removably mounted on the second blade mount 58. The blade tensioner arrangement 40 is provided to tension the blade 32 after the blade 32 has been mounted on the first and second blade mounts 28, 58 and to release tension from the blade 32 for removal and replacement of the blade 32.

In the illustrated embodiment, the first and second blade mounts 28, 58 each include a mounting post or pin 60 and the longitudinal end portions 30, 34 of the blade 32 each have an aperture or an opening 62 formed therethrough. The blade 32 is removably mounted to the first and second blade mounts 28, 58 by inserting the mounting posts or pins 60 through respective apertures or openings 62. Then, the user moves the first and second blade mounts 28, 58 relative to one another by manually operating the blade tensioner arrangement 40 to tension the blade 32.

As shown in FIG. 3, the mounting post or pin 60 of the first blade mount 28 is provided near the second end portion 24 of the detachable handle structure 14, and the mounting post or pins 60 of the second blade mount 58 is provided on an elongated spring biased arm 64. In illustrated embodiment, the mounting post or pin 60 of the first blade mount 28 is received in an aperture or opening 146 formed near the second end portion 24 of the detachable handle structure 14 to fixedly connect the mounting post or pins 60 with the second end portion 24. In illustrated embodiment, the mounting post or pin 60 of the second blade mount 58 is received in an aperture or opening (not shown) formed on the elongated spring biased arm 64 to fixedly connect the mounting post or pins 60 with the elongated spring biased arm 64. The arm 64 has one end pivotally mounted to the main saw frame structure 12 and an opposite end that provides the mounting post or pin 60. The guard member 68 of the frame member 48 includes a recess structured to receive the arm 64 therein. The arm 64 is pivotally mounted to an upper portion of the guard member 68 by a pin 70. A spring 72 is mounted between the arm 64 and the guard member 68 to maintain the arm 64 in generally parallel relation with the guard member 68 when no force is applied thereto. The arm 64 is pivotable to move the second blade mount 58 towards and away from the first blade mount 28 against biasing from the spring 72.

The blade tensioner arrangement 40 includes a lever 74 operatively connected to the arm 64. Specifically, the lever 74 is pivotally mounted to an adjustment mechanism mounting structure 76 provided below the guard member 68 of the frame member 48. The lever 74 is constructed and arranged to be pivotally moved between a blade tensioning position wherein the first and second blade mounts 28, 58 are moved relative to one another so as to tension the blade 32 between the first and second blade mounts 28, 58 and a blade releasing position wherein the first and second blade mounts 28, 58 are moved relative to one another so as to release the tension from the blade 32 and thereby allow removal and replacement of the blade 32.

An adjusting member 78 is mounted between the lever 74 and the arm 64. The adjusting member 78 is constructed and arranged to selectively move the arm 64 relative to the lever 74 so as to selectively adjust the amount of tension being applied to the blade 32 when the lever 74 is in the blade tensioning position thereof. The adjusting member 78 includes an elongated shaft 90 having a forward mounting portion 92 and a rearward threaded portion 94. The mounting portion 92 of the shaft 90 is attached to the arm 64 pivotally attached to the frame member 48. That is, a pin 96 extends through a recess provided in the arm 64 and a recess provided in the mounting portion 92 of the shaft 90 so as to couple the shaft 90 and the arm 64.

A pin 98, having an opening therethrough, is slidably engaged with the threaded portion 94 of the shaft 90. Specifically, the threaded portion 94 of the shaft 90 is inserted through the opening provided in the pin 98. A manually engagable knob 100 having an internally threaded bore is threadably engaged with the threaded portion 94 of the shaft 90. As a result, the knob 100 may be rotated to adjust its position on the shaft 90. In one embodiment, an e-clip 102 provides a stop to prevent the manually engagable knob 100 from falling off.

A lock 80 is slidably attached to the lever 74 to slide between a locked position wherein the lock 80 secures the lever 74 in the blade tensioning position, and an unlocked position wherein the lock 80 permits the lever 74 to be pivoted relative to a rearward portion 81 between the blade tensioning position and the blade releasing position.

A biasing structure 82 is mounted between the lever 74 and the lock 80 to positively locate the lock 80 in its locked and unlocked positions. The biasing structure 82 includes a spring 84 attached to the lever 74 that is operatively engaged with a ball 86 so as to bias the ball 86 into engagement with the lock 80. Also, a pin 88 is attached to the lever 74 and extends through an opening in the lock 80 to provide a hard stop for the lock 80 to limit its range of sliding movement.

The operation of the blade tensioner arrangement 40, including the lever 74, the biasing structure 82, the lock 80, the arm 64, the adjusting member 78, and their components thereof, is discussed in detail in commonly assigned U.S. Pat. No. 6,925,720, that is hereby incorporated by reference in its entirety, and hence will not be described in detail here. In another embodiment, the blade tensioning mechanism can be of the type described in commonly assigned U.S. Pat. No. 6,820,340, that is hereby incorporated by reference in its entirety. As will be appreciated by those skilled in the art reading this specification, the blade tensioner arrangement can be of any type such as, for example, a threaded rotational arrangements or other arrangements knows in the art.

In one embodiment, the blade tensioner arrangement may include a blade connector and a lever to adjust the position of the blade connector.

Figure 6:
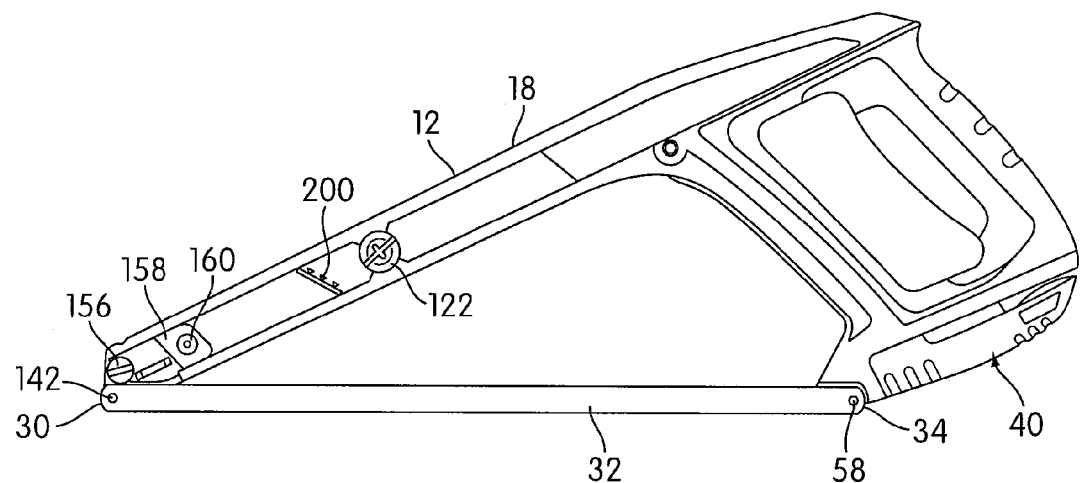
FIG. 6 shows a side view of the main saw frame structure in a low profile hacksaw configuration in accordance with an embodiment of the present invention.

The upper frame portion 18 of the main saw frame structure 12 includes a third blade mount 142. In one embodiment, the blade connector structure 142 provides the third blade mount 142. When the modular saw arrangement 10 is used in a low profile saw configuration (as shown in FIGS. 2D and 6), one of the longitudinal end portions 30 of the blade 32 is removably mounted on the third blade mount 142 and the other of the longitudinal end portions 34 of the blade 32 is removably mounted on the second blade mount 58. The blade tensioner arrangement 40 provides tension to the blade 32 after the blade 32 is mounted on the second and third blade mounts 58, 142 and releases tension from the blade 32 for removal and replacement of the blade 32.

In the illustrated embodiment, the third blade mount 142 includes a mounting post or pin 60 that is configured to engage with the aperture or an opening 62 formed on the longitudinal end portion 30 or 34 of the blade 32. In other words, the blade 32 is removably mounted to the second and the third blade mounts 58, 142 by inserting the mounting posts or pins 60 through respective apertures or openings 62. Then, the user moves the second and the third blade mounts 58, 142 relative to one another by manually operating the blade tensioner arrangement 40 to tension the blade 32.

As shown in FIG. 3, the mounting post or pin 60 of the third blade mount 142 is provided near a forward end portion 144 of the main saw frame structure 12. In illustrated embodiment, the mounting post or pin 60 of the third blade mount 142 is received in the aperture or opening 146 to fixedly connect the mounting post or pin 60 with the upper frame portion 18.

Figure 13:
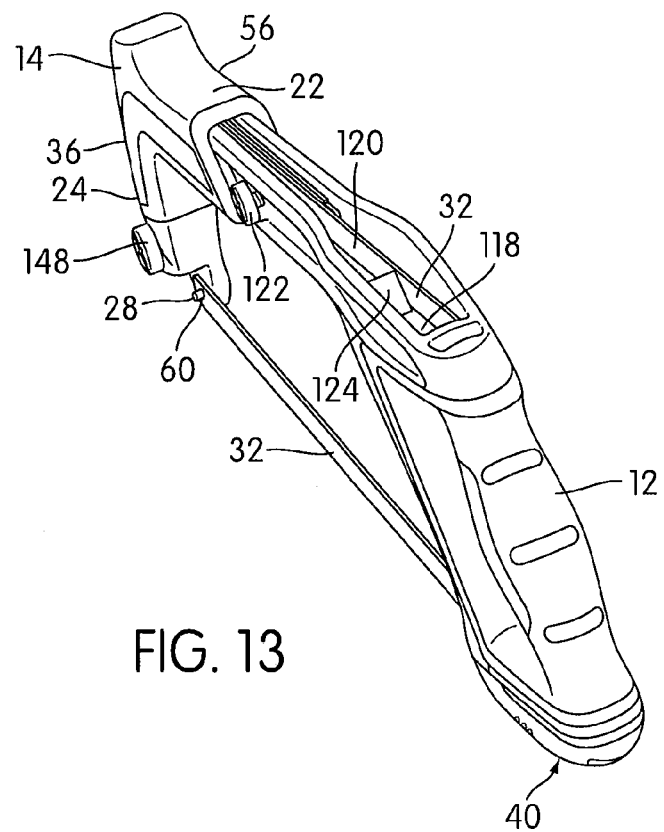
FIGS. 13 and 14 show perspective views of the modular saw arrangement in a regular hacksaw configuration showing a blade storage in accordance with an embodiment of the present invention.
Figure 14:
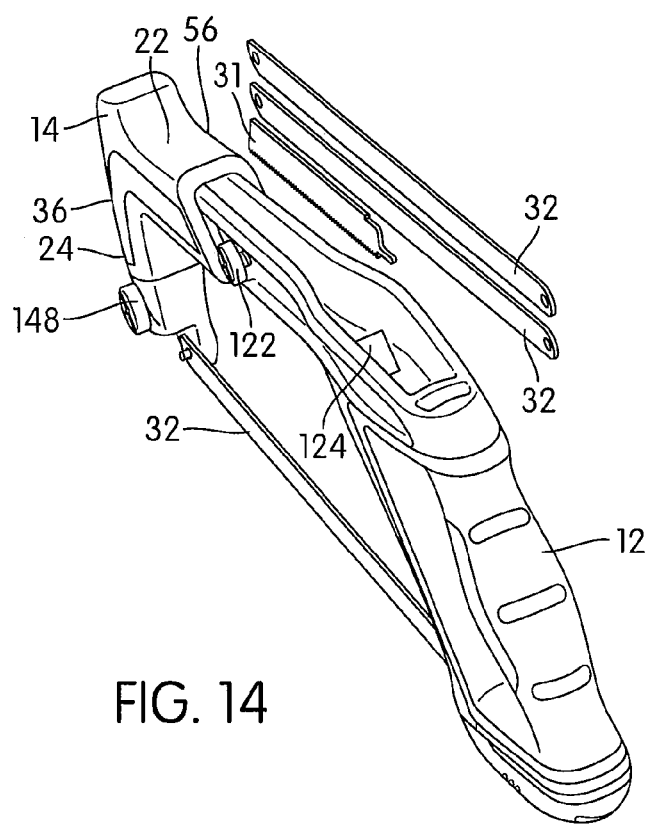

The modular saw arrangement 10 includes a blade storage 118 that is disposed on the upper frame portion 18 of the main saw frame structure 12. The blade storage 118 is configured to store one or more spare blades (e.g., the reciprocating saw blades 31 or the hacksaw blades 32) for future use by the user. The blade storage 118 is also shown in FIGS. 13 and 14. The blade storage 118 may include a channel portion 120, a clamp member 122, and one or more supporting ribs 124 (as shown in FIG. 4).

In one embodiment, the channel portion 120 may be of a U-shaped cross-sectional configuration. As will be appreciated by those skilled in the art reading this specification, other shaped cross-sectional configuration can be used for the channel portion 120 as long as the channel portion 120 is configured to receive spare blades for storage. In one embodiment, the channel portion 120 is constructed and arranged to receive both hacksaws and reciprocating saw blades for storage. In one embodiment, the channel portion 120 of the blade storage 118 may be configured to receive at least one blade. In one embodiment, as shown in FIG. 3, the channel portion 120 of the blade storage 118 may be configured to receive up to three blades. In one embodiment, as shown in FIG. 8, the stored spare blades 32 may bend slightly around posts 186, 188 of the main saw frame structure 12. In one embodiment, the stored spare blades 32 may be bent over and under the posts 186 and 188 of the main saw frame structure 12.

As shown in FIGS. 13 and 14, the blade storage channel 120 may be facing upwardly. Alternatively, the blade storage channel 120 may be facing downwardly. In one embodiment, as shown in FIGS. 13 and 14, the stored spare blades may be stored and removed from this channel 120 without disassembling the modular saw arrangement 10.

In one embodiment, the clamp member 122 may be in form of a threaded screw or knob that is configured to clamp the blades (i.e., stored in the channel portion 120) against surfaces 126 of the upper frame portion 18 to prevent any movement of the blades stored in the channel portion 120. The clamp member 122 is passed through screw receiving opening 128 disposed on the upper frame portion 18 to clamp the blades (i.e., stored in the channel portion 120) against the surfaces 126 of the upper frame portion 18 to prevent any movement of the spare blades stored in the channel portion 120.

In one embodiment, one or more supporting ribs 124 (as shown in FIG. 4) are disposed on the upper frame portion 18 to provide support to the spare blades stored in the channel portion 120. In one embodiment, a rear blade support spring clip (not shown) may be provided to support the rear end of spare blades stored in the channel portion 120 so that the stored spare blades do not rattle during the cutting operation.

In one embodiment, an alignment mark or an indicator 200 is located on the upper frame portion 18 of the main saw frame structure 12. The indicator 200 is constructed and arranged to provide an indication whether the detachable handle structure 14 is accurately positioned on the main saw frame structure 12.

In one embodiment, when the detachable handle structure 14 is correctly positioned on the main saw frame structure 12, the indicator 200 is aligned (conforms with) the shape of a forward end portion 202 of the detachable handle structure 14 to provide an indication to the user that the detachable handle structure 14 has been correctly oriented on the main saw frame structure 12. In one embodiment, the forward end portion 202 of the handle region 36 of the detachable handle structure 14 is generally inclined at an angle θ with respect to a generally vertical axis D-D (as shown in FIG. 4). In such embodiment, the indicator 200 may include an inclined alignment mark that aligns (or conforms with) the forward end portion 202 of the handle region 36. In one embodiment, the alignment indicator may be in the form of a mechanical indicator that shows a flag or a marker when the orientation of the detachable handle structure 14 to the main saw frame structure 12 is correct.

In one embodiment, the modular saw arrangement 10 may include a blade clamp arrangement or an inside cut jab saw (or long reach jab saw) clamp arrangement. The inside cut jab saw clamp arrangement may include a clamp member 156, an inside cut jab saw clamp plate 158, and a clamp plate mounting screw 160. The clamp member 156 and the clamp plate 158 are constructed and arranged to clamp a blade, when the modular saw arrangement 10 is in the inside cut jab saw configuration (as shown in FIGS. 2C, 7 and 8).

In one embodiment, the clamp plate 158 has a stepped configuration and includes a first portion 162 and a second portion 164. The first and the second portions 162, 164 include openings 166, 168 respectively. The openings 166, 168 are constructed and arranged to receive the clamp member 156 and the mounting screw 160, respectively. The operation in which the clamp member 156 and the clamp plate 158 clamp a blade is described in detail with respect to FIG. 8.

The forward end portion 144 of the main saw frame structure 12 also has a stepped configuration and includes a first portion 170 and a second portion 172. The first and the second portions 162, 164 of the clamp plate 158 are configured to engage with the first and the second portions 170, 172 of the forward end portion 144. The first and the second portions 170, 172 include openings 174, 176 respectively. The openings 174, 176 are constructed and arranged to align with the openings 166, 168, respectively, and to receive the clamp member 156 and the mounting screw 160, respectively. The clamp member 156 is configured to pass through the opening 166 in the clamp plate 158 and to be received in the opening 174 of the forward end portion 144 (i.e., in a normal configuration where the blade is not clamped). The clamp member 156 is configured to pass through the opening 166 in the clamp plate 158 and to clamp against surfaces of the blade 32 (i.e., in the long reach jab saw or inside cut configuration where the blade is clamped). The mounting screw 160 is configured to pass through the opening 168 in the clamp plate 158 and to be received in the opening 176 of the forward end portion 144 in order to attach the clamp plate 158 to the main saw frame structure 12.

In one embodiment, the detachable handle structure 14 is, for example, formed of a metal material. In one embodiment, the detachable handle frame structure 14 is, for example, fowled of a die cast aluminum material.

As noted above, the first end portion 22 of the detachable handle structure 14 includes a first opening or a hollow channel 104 that is sized and configured to slidably receive at least a portion of the upper frame portion 18 of the main saw frame structure 12. In one embodiment, the hollow channel 104 is of a rectangular cross-sectional configuration. It is contemplated that the hollow channel may have any other shaped cross-sectional configuration as long as the hollow channel 104 is sized and configured to slidably receive at least a portion of the upper frame portion 18.

In one embodiment, the first connector structure 130 is associated with the upper frame portion 18 of the main saw frame structure 12 and/or the first end portion 22 of the detachable handle structure 14. The first connector structure 130 is constructed and arranged to releasably connect the first end portion 22 of the detachable handle structure 14 with the upper frame portion 18 of the main saw frame structure 12. In one embodiment, the first connector structure 130 may be made of a resilient material. The detachable handle structure 14 includes a second opening 132 disposed between the first end portion 22 and the second end portion 24 of the detachable handle structure 14. The second opening 132 is constructed and arranged to receive the first connector structure 130 therein.

In one embodiment, a first engaging portion 134 of the first connector structure 130 is constructed and arranged to engage with a second engaging portion 136 disposed on the upper frame portion 18 of the main saw frame structure 12 so as to releasably connect the main saw frame structure 12 with the detachable handle structure 14.

In one embodiment, the first engaging portion 134 includes a flexible portion 178 and a protrusion 138 disposed on the flexible portion 178. The second engaging portion 136 includes a groove or a notch 140 that is constructed and arranged to receive the protrusion 138 therein.

In another embodiment, the first engaging portion 134 may include a groove or a notch and the second engaging portion may include a protrusion. Other structures and forms of connection between the first connector structure 130 and the main saw frame structure 12 can be used, as will be appreciated by those skilled in the art reading this specification. Also, in one embodiment, it is contemplated that the main saw frame structure 12 may be directly connected to a engaging structure/arrangement on the detachable handle structure 14, without the need of a separate connector member. For example, such engaging structure/arrangement may be disposed on inner walls of the hollow channel 104.

When the first connector structure 130 is placed into the second opening 132 of the detachable handle structure 14 and the upper frame portion 18 of the main saw frame structure 12 is being received in the hollow channel 104 of the detachable handle structure 14, the upper frame portion 18 of the main saw frame structure 12 moves into the hollow channel 104 until further movement of the upper frame portion 18 is prevented by the protrusion 138 provided on the flexible portion 178. At this point, a force is applied on the upper frame portion 18 causing the flexible portion 178 to flex outwards, thus, enabling the upper frame portion 18 to ride over the protrusion 138.

The flexible portion 178 return back to its original position after the upper frame portion 18 rides over the protrusion 138 such that the protrusion 138 of the flexible portion 178 is received in the groove or a notch 140 in the upper frame portion 18, thus securing the main saw frame structure 12 with the detachable handle structure 14. In one embodiment, the grip 56 is secured to the detachable handle structure 14 after securing the main saw frame structure 12 with the detachable handle structure 14 using the first connector structure 130.

As will be clear from the discussions with respect to FIG. 12, when the modular saw arrangement 10 is used in a grip (e.g., pistol grip) jab saw configuration, the first connector structure 130 may be removed to allow the hacksaw blade 32 pass through the second opening 132, thus, enabling the adjustment of the length of the hacksaw blade 32 in the pistol grip jab saw configuration. In other words, the blade 32 may be adjusted in and out of the detachable handle structure 14 and then locked in a position as desired by the user.

In one embodiment, the second blade connector 148 of the second end portion 24 of the detachable handle structure 14 includes a grip jab saw clamp member 148 that is constructed and arranged to clamp a blade, when the modular saw arrangement 10 is in the pistol grip jab saw configuration (as shown in FIGS. 2E, and 9-12). The grip jab saw clamp member 148 is described in detail with respect to FIG. 10.

The blade 32 (e.g., serrated cutting blade) includes opposing longitudinal end portions 30, 34 with a cutting edge 38 between the longitudinal end portions 30, 34. When the modular saw arrangement 10 is in the general hacksaw configuration, one end portion 30 of the blade 32 is removably mounted to the detachable handle structure 14 and the other end portion 34 is removably mounted to the blade tensioner arrangement 40, for example, located below the handle construction 16. When the modular saw arrangement 10 is in the low profile saw configuration, one end portion 30 of the blade 32 is removably mounted to the main saw frame structure 12 and the other end portion 34 is removably mounted to the blade tensioner arrangement 40, for example, located below the handle construction 16. When the modular saw arrangement 10 is in the inside cut saw configuration, the blade 32 is clamped against surfaces of the main saw frame structure 12, as will be explained in detail with respect to FIG. 8. When the modular saw arrangement 10 is in any of these configurations (i.e., general hacksaw configuration, low profile saw configuration or the inside cut saw configuration), the handle construction 16 is constructed and arranged to be manually grasped to enable performance of a cutting operation wherein the cutting edge 38 of the blade 32 is engaged with a workpiece and moves forwardly and rearwardly to cut the workpiece.

When the modular saw arrangement 10 is in the pistol grip jab saw configuration, the blade 32 is clamped against surfaces of the detachable handle structure 14, as will be explained in detail with respect to FIG. 10. When the modular saw arrangement 10 is in the pistol grip jab saw configuration, the handle region 36 is manually grasped to enable performance of a cutting operation wherein the cutting edge 38 of the blade 32 is engaged with a workpiece and moves forwardly and rearwardly to cut the workpiece.

When the modular saw arrangement 10 is in the pistol grip jab saw configuration or in inside cut saw configuration, the reciprocating saw blade 31 may also be used.

In one embodiment, when the modular saw arrangement 10 is in the regular hacksaw configuration and with the blade 32 installed on the first and the second blade mounts 28 and 58 and tensioned by the blade tensioner arrangement 40, the detachable handle structure 14 is locked in position and resists blade tension via torque moment between the end of main saw frame structure 12 and hollow rectangular channel 104. In other words, when the modular saw arrangement 10 is in the regular hacksaw configuration and with the blade 32 not installed on the first and the second blade mounts 28 and 58, the detachable handle structure 14 may or may not have a secondary means of retention on the main saw frame structure 12.

Figure 5:
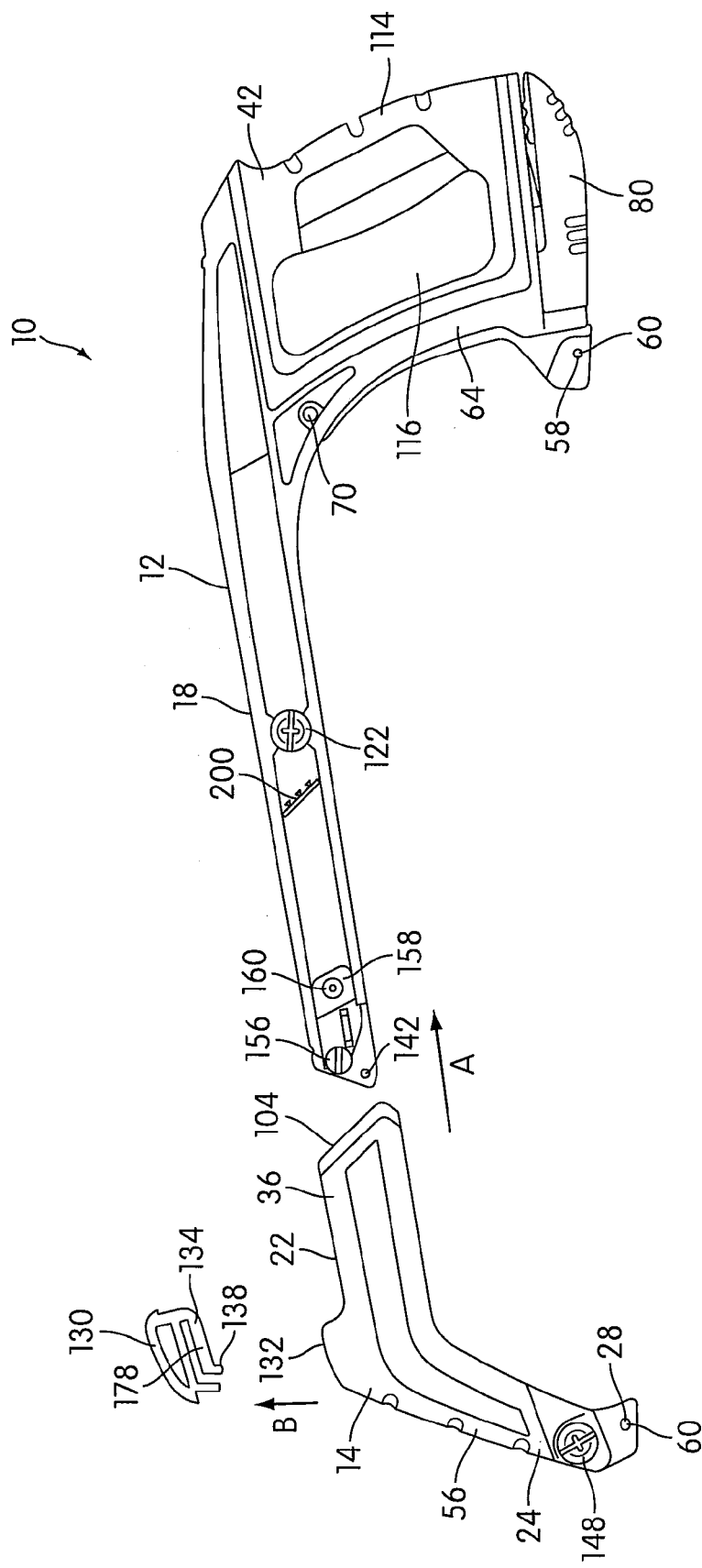
FIG. 5 shows a side view of the modular saw arrangement, wherein a detachable handle structure is released from a main saw frame structure in accordance with an embodiment of the present invention.

When the modular saw arrangement 10 is in the regular hacksaw configuration (as shown in FIGS. 1, 2A and 2B), the detachable handle structure 14 is separated from the main saw frame structure 12 first by removing the blade 32. This is done by releasing blade tension by opening the blade tensioner arrangement 40, and by removing the blade 32 from the first and the second blade mounts 28 and 58. Once the blade is removed from the blade mounts 28 and 58, the first connector structure 130 is pulled in an upwardly direction (as shown by the arrow B) from the second opening 132 of the detachable handle structure 14. After the first connector structure 130 is removed from the second opening 132 of the detachable handle structure 14, the main saw frame structure 12 may be moved out of the hollow channel 104 in the direction as shown by the arrow A. FIG. 5 shows the main saw frame structure 12 and the detachable handle structure 14 after they are separated from each other.

FIG. 6 shows a side view of the main saw frame structure 12 in the low profile hacksaw configuration. The low profile hacksaw configuration is created by using the main saw frame structure 12 and the blade 32. In this configuration, one end 30 of the blade 32 is connected to the third blade mount 142 and the opposite end 34 of the blade 32 connected to the second blade mount 58. In this low profile hacksaw configuration, the front end 30 of the blade 32 is supported by the main saw frame structure 12 rather than by the detachable handle structure 14 which was the case when the modular saw arrangement 10 in the regular hacksaw configuration (as shown in FIGS. 1, 2A and 2B). The blade tensioner arrangement 40 provides tension to the blade 32 after the blade 32 is mounted on the second and third blade mounts 58, 142 and releases tension from the blade 32 for removal and replacement of the blade 32.

FIGS. 7 and 8 show a side view and a cross-sectional view of the modular saw arrangement 10 is in the long reach jab saw or the inside cut configuration, where a hacksaw blade 32 is used. This configuration is created in a similar manner as the low profile hacksaw configuration with the exception of mounting the blade 32.

In one embodiment, the forward end portion 144 of the main saw frame structure 12 includes a slot 180 that is configured to receive, for example, the hacksaw blade 32.

The hacksaw blade 32 is inserted into the slot 180 in the forward end portion 144 of the main saw frame structure 12 and is clamped in position using the clamp member 156 and the clamp plate 158.

In one embodiment, the clamp member 156 may be in form of a threaded screw or knob that is configured to pass through the opening 166 in the clamp plate 158 and to be received in the opening 174 of the forward end portion 144. The clamp member 156 and the clamp plate 158 are configured to clamp the blade 32 (i.e., received in the slot 180) against surfaces 182 of the forward end portion 144 to prevent any movement of the blade 32 received in the slot 180. Thus, the blade 32 rests against surfaces 184 of the clamp plate 158 on one side and against the surfaces 182 of the forward end portion 144, as being clamped by the clamp member 156 and the clamp plate 158, to prevent any movement of the blade 32 received in the slot 180.

The blade 32 may be adjusted in and out of the main saw frame structure 12 and then locked in a position as desired by the user. It is noted that a reciprocating saw blade 31 (as shown in FIG. 3) may also be used in this configuration. In this long reach jab saw or inside cut configuration, one or more spare blades may still be stored in the blade storage 118.

FIGS. 9-12 show views of the modular saw arrangement 10 is in the pistol grip jab saw configuration. FIGS. 9 and 10 show a side view and a cross-sectional view of the modular saw arrangement 10 is in the pistol grip jab saw configuration, where a reciprocating saw blade 31 is used. FIGS. 11 and 12 show side views of the modular saw arrangement 10 is in the pistol grip jab saw configuration, where a hacksaw blade 32 is used.

In one embodiment, as shown in FIG. 10, the second end portion 24 of the detachable handle structure 14 includes a slot 150 that is configured to receive, for example, the reciprocating saw blade 31.

In one embodiment, the grip jab saw clamp member 148 may be in form of a threaded screw or knob that is configured to clamp the blade 31 (i.e., received in the slot 150) against surfaces 152 of the second end portion 24 to prevent any movement of the blade 31 received in the slot 150. The clamp member 148 is passed through screw receiving opening 154 disposed on the second end portion 24 to clamp the blade 31 (i.e., received in the slot 150) against the surfaces 152 of the second end portion 24 to prevent any movement of the blade 31.

FIGS. 11 and 12 shown the modular saw arrangement 10 in pistol grip jab saw configuration, where the hacksaw blade 32 (instead of the reciprocating saw blade 31 as shown in FIGS. 9 and 10) is used. In such an embodiment, the clamp member 148 is passed through screw receiving opening 154 (as shown in FIG. 10) disposed on the second end portion 24 to clamp the hacksaw blade 32 (i.e., received in the slot 150 (as shown in FIG. 10)) against the surfaces 152 (as shown in FIG. 10) of the second end portion 24 to prevent any movement of the hacksaw blade 32. In this pistol grip jab saw configuration, the hacksaw blade 32 may be adjusted in and out of the detachable handle structure 14 and then locked in a position (i.e., using the clamp member 148) as desired by the user. If the blade 32 is adjusted out the detachable handle structure 14 as shown in FIG. 12, then sufficient hand protection may be provided to prevent injury to the user. It is noted that both the reciprocating saw blade 31 (as shown in FIG. 3) and the hacksaw blade 32 may also be used in this pistol grip jab saw configuration.

Although the invention has been described in detail for the purpose of illustration, it is to be understood that such detail is solely for that purpose and that the invention is not limited to the disclosed embodiments, but, on the contrary, is intended to cover modifications and equivalent arrangements that are within the spirit and scope of the appended claims. In addition, it is to be understood that the present invention contemplates that, to the extent possible, one or more features of any embodiment can be combined with one or more features of any other embodiment.

What is claimed is:

1. A modular saw arrangement, comprising:
   a main saw frame structure having a handle construction, an upper frame portion, and a blade tensioner arrangement;
   a detachable handle structure having a first end portion and a second end portion;

a first connector structure associated with the upper frame portion of the main saw frame structure and/or the first end portion of the detachable handle structure, the first connector structure arranged to releasably connect the first end portion of the detachable handle structure to the upper frame portion of the main saw frame structure, the second end portion of the detachable handle structure having a first blade connector, wherein the first blade connector and the blade tensioner arrangement are configured to be connected with opposite ends of a blade when the first end portion of the detachable handle structure is connected with the upper frame portion of the main saw frame structure so as to form a hacksaw configuration;

the first end portion of the detachable handle structure comprising a handle region, and the second end portion of the detachable handle structure having a second blade connector that enables attachment of the blade in a grip configuration to enable the detachable handle structure to be configured as a stand-alone detachable handle saw when the first end portion of the detachable handle structure is disconnected with the upper frame portion of the main saw frame structure, wherein the upper frame portion of the main saw frame structure includes a blade clamp arrangement constructed and arranged such that, with the first end portion of the detachable handle structure disconnected with the upper frame portion of the main saw frame structure, the blade clamp arrangement enables attachment of the blade thereto to enable the main saw frame structure to be configured as a stand-alone saw for performing cutting operations, wherein the blade clamp arrangement is separate from the second blade connector, and wherein the first blade connector is separate from the second blade connector.

2. The modular saw arrangement of claim 1, wherein the second blade connector of the second end portion of the detachable handle structure comprises a grip clamp member configured to clamp the blade against surfaces of the detachable handle structure.

3. The modular saw arrangement of claim 1, wherein the blade clamp arrangement enables attachment of the blade thereto to enable the main saw frame structure to be configured as a stand-alone long reach jab saw.

4. The modular saw arrangement of claim 3, wherein the blade clamp arrangement comprises a long reach clamp member and a long reach clamp plate that are configured to clamp the blade against surfaces of the main saw frame structure.

5. The modular saw arrangement of claim 1, wherein the blade clamp arrangement of the upper frame portion of the main saw frame structure further includes a blade connector structure at a distal end thereof that enables attachment of the blade between the blade connector structure and the blade tensioner arrangement to enable the main saw frame structure to be configured as a stand-alone low profile hacksaw.

6. The modular saw arrangement of claim 1, wherein the upper frame portion of the main saw frame structure includes a blade storage for storing a second blade.

7. The modular saw arrangement of claim 6, wherein the second blade is a reciprocating saw blade.

8. The modular saw arrangement of claim 6, wherein the second blade is a hacksaw blade.

9. The modular saw arrangement of claim 1, wherein the upper frame portion of the main saw frame structure includes an indicator located on the upper frame portion, the indicator is constructed and arranged to provide an indication whether the detachable handle structure is accurately positioned on the main saw frame structure.

10. The modular saw arrangement of claim 1, wherein the first end portion of the detachable handle structure includes a first opening constructed and arranged to receive the upper frame portion of the main saw frame structure.

11. The modular saw arrangement of claim 1, wherein the detachable handle structure includes a second opening constructed and arranged to receive the first connector structure therein.

12. The modular saw arrangement of claim 1, wherein the blade tensioner arrangement includes a blade connector and a lever to adjust a position of the blade connector.

13. The modular saw arrangement of claim 1, wherein the detachable handle structure is a pistol grip saw frame structure.

14. The modular saw arrangement of claim 1, wherein the handle construction of the main saw frame structure is a closed handle construction.

15. A modular saw arrangement, comprising:
a first blade;
a main saw frame structure having a handle construction, an upper frame portion, and a blade tensioner arrangement; and
a detachable handle structure constructed and arranged to releasably connect with the upper frame portion of the main saw frame structure, the blade tensioner arrangement and a connector on an end portion of the detachable handle structure being arranged to connect with opposite ends of a first blade to provide a hacksaw configuration;
the upper frame portion of the main saw frame structure having a blade storage for storing a second blade; and
the detachable handle structure having a detachable handle saw attachment structure enabling attachment of one of the first blade or the second blade, and the upper frame portion of the main saw frame structure having a main saw attachment structure enabling attachment of the other of the first blade or the second blade, such that when the detachable handle structure and the main saw frame structure are disconnected from one another, both may be configured to perform cutting operations,
wherein the connector of the detachable handle structure and the detachable handle saw attachment structure are both disposed on the same end portion of the detachable handle structure, and wherein the detachable handle saw attachment structure is separate from the connector of the detachable handle structure.

16. The modular saw arrangement of claim 15, further comprising a first connector structure associated with the upper frame portion of the main saw frame structure and/or the detachable handle structure, the first connector structure arranged to releasably connect the detachable handle structure to the upper frame portion of the main saw frame structure.

17. The modular saw arrangement of claim 16, wherein the detachable handle structure includes a second opening constructed and arranged to receive the first connector structure therein.

18. The modular saw arrangement of claim 15, wherein the main saw attachment structure comprises a blade clamp arrangement that enables attachment of one of the first blade or the second blade to the upper frame portion of the main saw frame structure to enable the main saw frame structure to be configured as a stand-alone long reach jab saw.

19. The modular saw arrangement of claim 18, wherein the blade clamp arrangement comprises a long reach clamp member and a long reach clamp plate that are configured to clamp one of the first blade or the second blade against surfaces of the upper frame portion of the main saw frame structure.

20. The modular saw arrangement of claim 15, wherein the main saw attachment structure comprises a blade connector structure at a distal end of the main saw frame structure that enables attachment of one of the first blade or the second blade between the blade connector structure and the blade tensioner arrangement to enable the main saw frame structure to be configured as a stand-alone low profile hacksaw.

21. The modular saw arrangement of claim 15, wherein the detachable handle saw attachment structure comprises a grip clamp member configured to clamp one of the first blade or the second blade against surfaces of the detachable handle structure.

22. The modular saw arrangement of claim 15, wherein the upper frame portion of the main saw frame structure includes an indicator located on the upper frame portion, the indicator is constructed and arranged to provide an indication whether the detachable handle structure is accurately positioned on the main saw frame structure.

23. The modular saw arrangement of claim 15, wherein the detachable handle structure includes a first opening constructed and arranged to receive the upper frame portion of the main saw frame structure.

24. The modular saw arrangement of claim 15, wherein the detachable handle structure is a pistol grip saw frame structure.

25. The modular saw arrangement of claim 15, wherein the handle construction of the main saw frame structure is a closed handle construction.

26. A modular saw arrangement, comprising:
a main saw frame structure having a handle construction, an upper frame portion, and a blade tensioner arrangement;
a detachable handle structure;
the main saw frame structure and the detachable handle structure being releasably connectable to form a hacksaw frame, wherein the main saw frame structure having a blade tensioner arrangement and the detachable handle structure having a first blade connector disposed on an end portion thereof, wherein the blade tensioner arrangement and the first blade connector adapted to connect with opposite ends of a saw blade when the detachable handle structure is connected with the main saw frame structure so as to form the hacksaw frame;
the main saw frame structure comprising a connector, the connector and the blade tensioner arrangement constructed and arranged to connect with opposite ends of the saw blade to form a low profile hacksaw when the main saw frame structure is disconnected from the detachable handle structure;
the upper frame portion of the main saw frame structure further arranged, when disconnected from the detachable handle structure, to connect with one end portion of the saw blade, with the opposite end portion of the saw blade extending away from the handle construction; and
the detachable handle structure having a second blade connector constructed and arranged, when disconnected from the main saw frame structure, to connect with one end portion of a saw blade to form a jab saw configuration, with the detachable handle structure providing a handle portion for the jab saw configuration,
wherein the first blade connector is separate from the second blade connector, and wherein the first blade connector and the second blade connector of the detachable handle structure are both disposed on the same end portion of the detachable handle structure.

27. The modular saw arrangement of claim 26, further comprising a first connector structure associated with the upper frame portion of the main saw frame structure and/or the detachable handle structure, the first connector structure arranged to releasably connect the detachable handle structure to the upper frame portion of the main saw frame structure.

28. The modular saw arrangement of claim 27, wherein the detachable handle structure includes a second opening constructed and arranged to receive the first connector structure therein.

29. The modular saw arrangement of claim 26, wherein the upper frame portion of the main saw frame structure includes an indicator located on the upper frame portion, the indicator is constructed and arranged to provide an indication whether the detachable handle structure is accurately positioned on the main saw frame structure.

30. The modular saw arrangement of claim 26, wherein the detachable handle structure includes a first opening constructed and arranged to receive the upper frame portion of the main saw frame structure.

31. The modular saw arrangement of claim 26, wherein one of the connectors is the blade tensioner arrangement and other of the connectors is a blade connector structure disposed at a distal end of the main saw frame structure.

32. The modular saw arrangement of claim 26, further comprises a grip clamp member configured to clamp the saw blade against surfaces of the detachable handle structure, when the detachable handle structure is in the jab saw configuration.

33. The modular saw arrangement of claim 26, further comprises a long reach clamp member and a long reach clamp plate that are configured to clamp the saw blade against surfaces of the upper frame portion of the main saw frame structure, when the one end of the saw blade is connected to the upper frame portion of the main saw frame structure with the opposite end portion of the saw blade extending away from the handle construction.

34. The modular saw arrangement of claim 26, wherein the detachable handle structure is a pistol grip saw frame structure.

35. The modular saw arrangement of claim 26, wherein the handle construction of the main saw frame structure is a closed handle construction.

\* \* \* \* \*